(12) United States Patent
Gritz et al.

(10) Patent No.: US 7,679,057 B2
(45) Date of Patent: Mar. 16, 2010

(54) ANTENNA-COUPLED-INTO-RECTIFIER INFRARED SENSOR ELEMENTS AND INFRARED SENSORS

(75) Inventors: Michael A. Gritz, Santa Barbara, CA (US); William H. Wellman, Santa Barbara, CA (US); Rafael Hernandez, Oxnard, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/978,880

(22) Filed: Oct. 30, 2007

(65) Prior Publication Data

US 2009/0108202 A1 Apr. 30, 2009

(51) Int. Cl.
*G01J 5/00* (2006.01)
(52) U.S. Cl. .................................................. 250/338.1
(58) Field of Classification Search ............... 250/338.1
See application file for complete search history.

(56) References Cited

U.S. PATENT DOCUMENTS

| | | | | |
|---|---|---|---|---|
| 5,043,739 A | * | 8/1991 | Logan et al. ................ | 343/701 |
| 6,310,346 B1 | * | 10/2001 | Boreman et al. ......... | 250/338.4 |
| 6,433,985 B1 | * | 8/2002 | Voldman et al. ........... | 361/113 |
| 6,885,002 B1 | * | 4/2005 | Finch et al. ................ | 250/332 |
| 7,095,027 B1 | * | 8/2006 | Boreman et al. ......... | 250/338.4 |
| 2003/0011528 A1 | * | 1/2003 | Marchand ................... | 343/793 |
| 2006/0267150 A1 | * | 11/2006 | Estes .......................... | 257/595 |

FOREIGN PATENT DOCUMENTS

JP 2001296183 A * 10/2001

OTHER PUBLICATIONS

F. Gonzalez et al., "Two Dimensional Array of Antenna-Coupled Microbolometers", International Journal of Infrared and Millimeter Waves, vol. 23, No. 5, May 2002.
M. Gritz et al., "Fabrication of Infrared Antennas Using Electron Beam Lithography", Micromachining Technology for Micro-Optics and Nano-Optics, Proceedings of SPIE vol. 4984, 2003.

(Continued)

*Primary Examiner*—Constantine Hannaher
(74) *Attorney, Agent, or Firm*—Leonard A. ALkov

(57) ABSTRACT

An infrared sensor element having an antenna coupled directly into a rectifier. Infrared radiation impinging the antenna induces an alternating current. The rectifier converts the alternating current into a rectified signal. The rectified signal corresponds to a magnitude of the incident infrared radiation impinging the antenna, and can be used for detection and imaging operations. Coupling the antenna directly into the rectifier eliminates the need for a photodetector. The wavelength of sensor elements can be separately tuned. A sensor made up of a plurality of such sensor elements can operate in a time-division multiplexed mode sensing different infrared bandwidths in separate time segments. Two or more sensors each made up of a plurality of sensor elements can be co-located in a single focal plane and operated separately to detect infrared radiation in different bandwidths. A sensor element can also operate in bandwidths other than infrared.

20 Claims, 10 Drawing Sheets

OTHER PUBLICATIONS

M. MacDonald et al., "Niobium Microbolometers for Far-Infrared Detection", IEEE Transactions on Microwave Tehory and Techniques, vol. 43, No. 4, Apr. 1995.

M. Gritz et al., "Fabrication of an Infrared Antenna-Coupled Microbolometer Linear Array using chrome as a Mask", J. Vac. Sci. Technol. B 21(6) Nov./Dec. 2003, American Vacuum society pp. 2608-2611.

I. Wilke, W. Herrmann, F.K. Kneubeuhl"Integrated nanostrip dipole antennas for coherent 30THz infrared radiation"; Applied Physics. B 58, 87 (1994).

I. Wilke, Y.Oppliger, W.Herrmann, F.K.Kneubuehl Nanometer thin-film Ni-NiO-Ni diodes for 30THz radiation; Applied Physics A 58, 329 (1994).

Pierett, R.F., *Semiconductor Device Fundamentals*, Chapter 16, Addison-Wesley, New York, 1996.

Balanis, C.A., Antenna Theory, Chapter 14, John Wiley, New York, (1997).

Codreanu and G. D. Boreman, "Influence of Dielectric Substrate on the Responsivity of Microstrip Dipole-Antenna-Coupled Infrared Microbolometers," Appl. Opt. 41, 1835-1840 (2002).

* cited by examiner

ANTENNA PATTERN ACHIEVED WITH AEROGEL ISOLATION LAYER

ANTENNA PATTERN ACHIEVED WITH SiO$_2$ ISOLATION LAYER

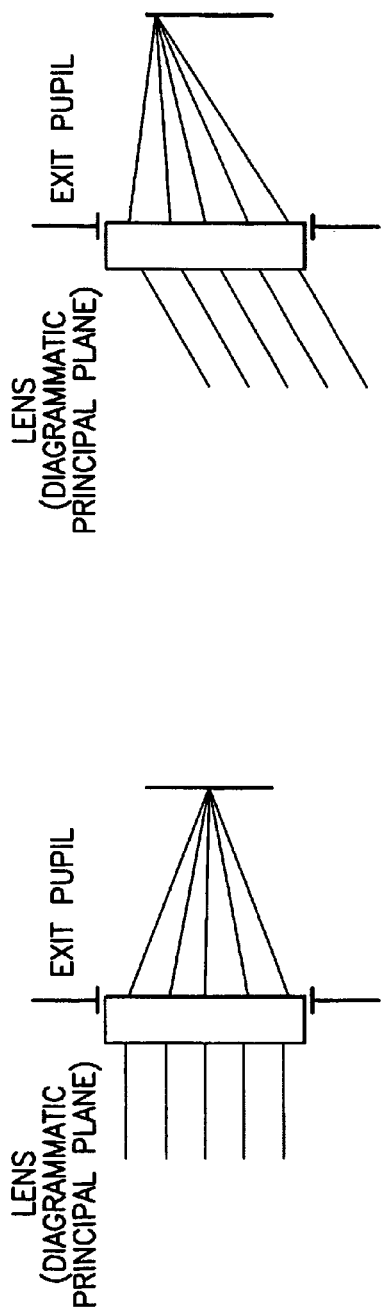
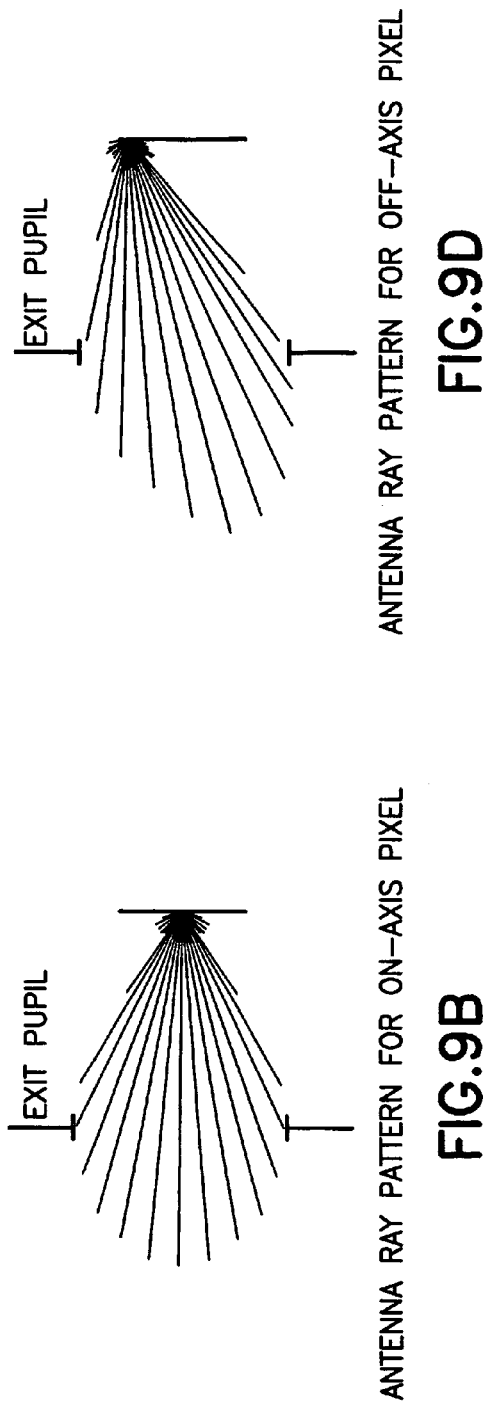
FIG.9C LENS RAY PATTERN FOR OFF-AXIS PIXEL
FIG.9D ANTENNA RAY PATTERN FOR OFF-AXIS PIXEL
FIG.9A LENS RAY PATTERN FOR ON-AXIS PIXEL
FIG.9B ANTENNA RAY PATTERN FOR ON-AXIS PIXEL

ANTENNA-COUPLED-INTO-RECTIFIER INFRARED SENSOR ELEMENTS AND INFRARED SENSORS

TECHNICAL FIELD

The invention generally concerns infrared sensor elements and sensors made up of a plurality of sensor elements, and more particularly concerns infrared sensor elements having antennas coupled directly to rectifying circuits, and sensors made up of a plurality of such antenna-coupled-into-rectifier sensor elements.

BACKGROUND

Infrared-based imaging and detection devices have found widespread use and are known to those skilled in the art as "FLIRs" (an acronym derived from "Forward-Looking Infrared"). Since infrared-based imaging devices sense temperature differences between objects in a field of view, they are particularly useful at night and in daytime during periods of reduced visibility. In contrast to the visible spectrum, the infrared spectrum frequently provides high contrast images at night and during periods of reduced visibility. This results from a number of factors, a first factor being that infrared-based imaging devices sense temperature differences between objects in a field of view. At night and during daytime periods of reduced visibility there is frequently a significant thermal contrast between objects of interest (such as, for example, vehicles and persons) and a background. A second factor results from the fact that during periods of reduced visibility atmospheric obscurants (such as, for example, smoke or sand) may attenuate visible light to a far greater degree than infrared radiation.

Infrared-based imaging devices use infrared detectors to detect infrared radiation emanating from objects in a field of view. Conventional infrared detectors are constructed from exotic semiconductor materials such as HgCdTe and InSb. A particular limitation of conventional infrared detectors is their need to be cooled to cryogenic temperatures in order to achieve desired levels of thermal sensitivity. The requirement for active cooling increases the cost, complexity and power consumption of such infrared imaging devices, and distinguishes them from visible-spectrum video cameras that do not require such active cooling. In addition, the need for cooling apparatus introduces complexities into the design of optical elements used in combination with the infrared detectors of infrared-based imaging devices.

Infrared-based imaging devices using detectors that are not cryogenically cooled are known, but lack fast response times for operation in dynamic situations. Uncooled sensors also lack narrow-bandwidth spectral responses for surveillance and identification.

For purposes of surveillance and identification, it is often useful to limit the response of a sensor to a particular bandwidth. If an object that is to be detected is known to have a unique thermal signature because it emanates infrared radiation of a particular wavelength or combination of wavelengths, tuning the response of the sensor to the particular wavelength or combination of wavelengths serves a filtering function by eliminating other objects that have different thermal signatures from consideration.

Progress has been made in providing tunability for infrared detectors through the introduction of antenna-coupled infrared detectors. In antenna-coupled infrared detectors, an antenna element sensitive to infrared radiation is coupled to a conventional infrared photodetector. Such antenna-coupled infrared photodetectors are frequency-tunable and may have an adjustable polarization response. Nonetheless, infrared-based imaging or detection devices that are to be used in dynamic situations require the use of cooled detectors, thereby increasing the cost and complexity of such devices.

Accordingly, those skilled in the art desire improved designs for infrared sensor elements and sensors that eliminate the need for cooling; achieve or exceed the sensitivity of conventional infrared detectors; and preserve the advantages of antenna-coupled detectors.

SUMMARY OF THE PREFERRED EMBODIMENTS

The foregoing and other problems are overcome, and other advantages are realized, in accordance with the following embodiments of the present invention.

A first embodiment of the invention is an infrared sensor element having an antenna responsive to infrared radiation and a rectifying circuit coupled to an output of the antenna. The rectifying circuit converts alternating current induced in the antenna by incident infrared radiation into a rectified signal. The rectified signal corresponds to a magnitude of the incident infrared radiation impinging the antenna.

A second embodiment of the invention is an infrared sensor comprising a plurality of infrared sensor elements and a multiplexing circuit. Each of the plurality of sensor elements comprises an antenna responsive to infrared radiation and a rectifying circuit coupled to an output of the antenna. The rectifying circuits of each of the infrared sensor elements convert alternating current induced in the antennas by incident infrared radiation into rectified signals. The rectified signals correspond to the magnitudes of the incident infrared radiation impinging the antennas of the infrared sensor elements. The multiplexing circuit is coupled to the infrared sensor elements, and combines the rectified signals generated in the infrared sensor elements by impinging infrared radiation into a serial signal.

A third embodiment of the invention is an infrared sensor comprising at least two arrays of sensor elements. The at least two arrays of sensor elements are physically coincident, but each of the at least two arrays operate as separate sensors. Each of the at least two arrays of sensor elements further comprise a plurality of sensor elements and a multiplexing circuit. Each of the sensor elements comprise an antenna responsive to infrared radiation and a rectifying circuit coupled to an output of the antenna. The rectifying circuits convert alternating currents induced in the antennas by incident infrared radiation into a rectified signal. The rectified signals correspond to magnitudes of the incident infrared radiation impinging the antennas. The multiplexing circuits are coupled to the infrared sensor elements, and combine the signals generated in the infrared sensor elements by impinging infrared radiation into a serial signal.

A fourth embodiment of the invention is a sensor element having an antenna responsive to ultra-high frequency microwave radiation and a rectifying circuit coupled to an output of the antenna. The rectifying circuit converts alternating current induced in the antenna by incident ultra-high frequency microwave radiation into a rectified signal. The rectified signal corresponds to a magnitude of the incident ultra-high frequency microwave radiation impinging the antenna.

A fifth embodiment of the invention is a sensor comprising a plurality of sensor elements and a multiplexing circuit. Each of the plurality of sensor elements comprises an antenna responsive to ultra-high frequency microwave radiation and a rectifying circuit coupled to an output of the antenna. The rectifying circuits of each of the sensor elements convert alternating current induced in the antenna by incident ultra-high frequency microwave radiation into a rectified signal. The rectified signal corresponds to a magnitude of the incident ultra-high frequency microwave radiation impinging the antenna of the sensor element. The multiplexing circuit is configured to combine signals generated in the sensor elements by impinging ultra-high frequency microwave radiation into a serial signal.

In conclusion, the foregoing summary of the various embodiments of the present invention is exemplary and non-limiting. For example, one of ordinary skill in the art will understand that one or more aspects or steps from one alternate embodiment can be combined with one or more aspects or steps from another alternate embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 9A-D are charts showing ray patterns for optical imaging and antenna gain patterns for on and off axis pixels in accordance with an embodiment of the invention;

DETAILED DESCRIPTION OF THE PREFERRED EMBODIMENTS

Figure 1:
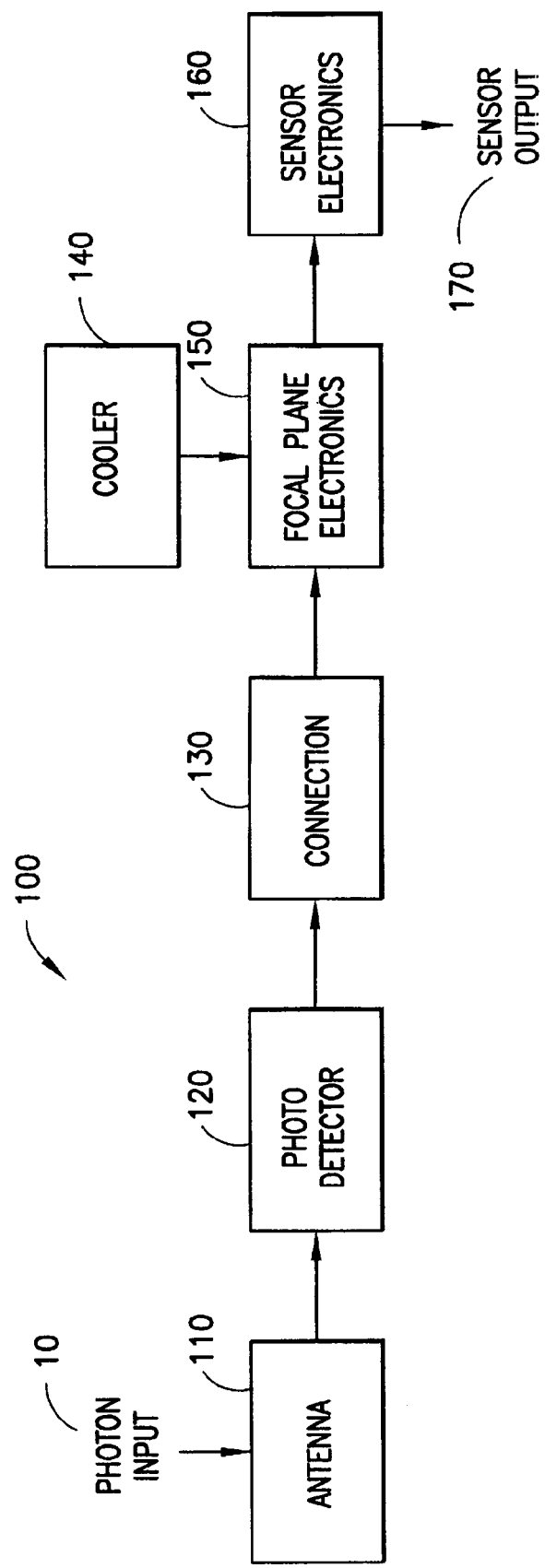
FIG. 1 is a block diagram depicting an infrared sensor made in accordance with the prior art.

Before describing infrared sensor elements and sensors operating in accordance with the invention, an infrared sensor made in accordance with the prior art will be described. FIG. 1 is a block diagram depicting an antenna-coupled-into-photodetector infrared sensor 100 made in accordance with the prior art. In the conventional device, photons 10 impinge antenna 110. The photons induce a current in the antenna 110, which is coupled into photodetector 120. Although a single antenna 110 and a single photodetector 120 are shown in FIG. 1, in certain applications (such as, for example, imaging applications) sensor 100 will comprise a plurality of sensor elements each comprising an antenna 110 and a photodetector 120. The output of the photodetector 120 is then coupled by connection 130 to focal plane electronics 150. A cooler 140 is operative to cool the focal plane electronics 150, the photodetector 120, and the antenna 110. The output of the focal plane electronics is then output to sensor electronics 160, which generate a sensor output 170 (such as, for example, a FLIR image).

Figure 2A:
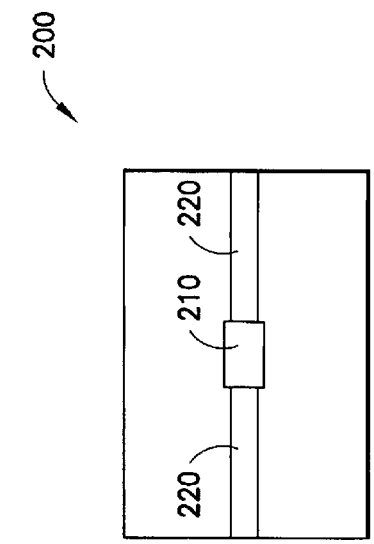
FIGS. 2A-B depict a cross-sectional view and a top view, respectively, of an infrared sensor element made in accordance with the prior art.
Figure 2B:
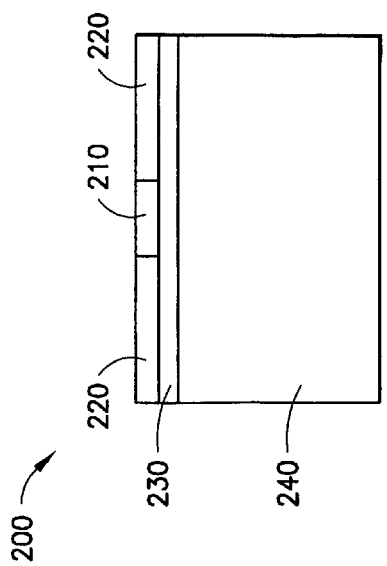

FIGS. 2A-B depict an individual sensor element 200 incorporated in the infrared sensor 100 depicted in FIG. 1. The sensor element 200 comprises a niobium bolometer photodetector 210 with gold dipoles 220 fabricated on a silicon-dioxide-coated 230 ground plane 240 comprised of silicon.

Figure 3:
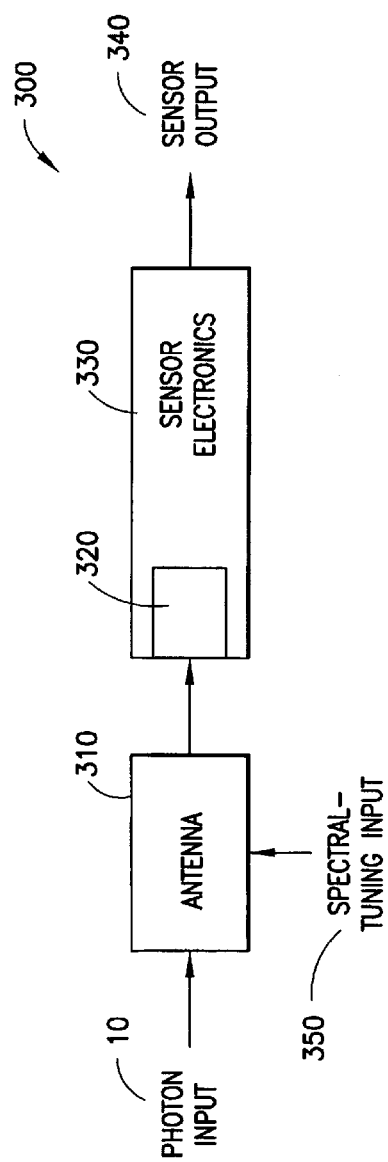
FIG. 3 is a block diagram depicting an infrared sensor made in accordance with the invention.

In contrast to the sensor element 200 of the prior art, a sensor element 300 made in accordance with the invention couples output of an antenna 310 directly into a rectifying circuit 320 incorporated in sensor electronics 330 as shown in FIG. 3. Thus, the sensor element 300 of the invention couples the antenna output directly into the sensor electronics, rather than into a photodetector and associated focal plane electronics as in the prior art. Nanofabrication technology like that used to fabricate computer chips is used in this invention to fabricate ultra-high frequency rectifying elements. In an imaging application the output 340 of a plurality of such sensor elements 300 would be input into imaging electronics.

A comparison of FIGS. 1 and 3 indicates in a sensor element made in accordance with the invention that not only is the number of parts reduced, the temperature control is also eliminated. Even so-called uncooled photodetectors require a thermoelectric cooling module to hold photodetector temperatures close to 20° C. or so, by counteracting typical changes in ambient temperatures that typically span −55 to −30° C. to +55 to +90° C. In certain embodiments of the invention no cooling is required, over the full military temperature range, even into ultra-long infrared wavelengths. This dramatically reduces size, weight and readiness time.

By eliminating the Dewar and the cryogenic cooler, not only are sensor size and power reduced, the sensor element is fully and closely integrated into the electronics. This improves physical ruggedness, since the electronics board is naturally stiff in lateral dimensions, whereas the coldfinger of a conventional sensor is naturally flexible; that flexibility, combined with inherently poor damping, gives rise to image blurring that degrades resolution. New designs achievable with the current invention avoid blurring problems even in strenuous environments.

Integration of the detector and electronics also improves electrical ruggedness, since wiring runs from detector to electronics are avoided. The detector and associated focal plane electronics can be implemented on the same circuit board as the animating clock-driver electronics and the signal conditioning electronics.

Figure 4:
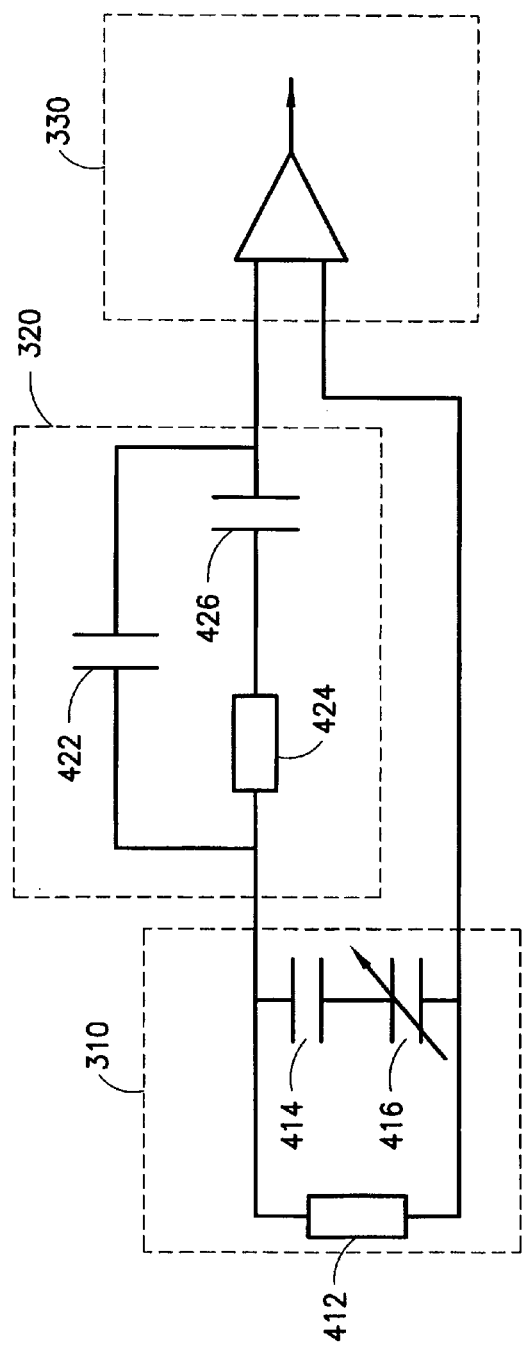
FIG. 4 is an equivalent circuit diagram of a sensor element made in accordance with the invention.

As described previously, in embodiments operating in accordance with the invention, the infrared antenna is coupled directly into electronics, rather than into a photodetector. A nano-fabricated Schottky or Mott diode is used as detection means, capturing the magnitude of the electromagnetic radiation. As shown in the equivalent circuit block diagram of FIG. 4, the resultant diode-rectified signal is fed directly into a preamplifier 330. As shown by the equivalent circuit depicted in FIG. 4, the antenna portion 310 is represented by an inductance 412 associated with the antenna in parallel with a capacitance 414 associated with the antenna and a tunable capacitance 416 associated with the varactor. The rectifier portion 320 of the equivalent circuit comprises a series combination of the rectifier resistance 424 and rectifier capacitance 426 in parallel with a filter capacitance 422. One skilled in the art will understand that FIG. 4 depicts an exemplary equivalent circuit representation of an antenna-coupled-into-rectifier sensor element capable of operating in accordance with the invention. Other implementations in accordance with the invention may have a different equivalent circuit representation. While FIGS. 3-4 illustrate a single element, an array of such elements can capture a two-dimensional image in a format very similar to that of current focal plane arrays with photodetector elements.

A nano-fabricated Schottky or Mott diode is used as a rectifying element because the switching time of such a diode can be fast enough for detecting terahertz infrared frequencies. It can also detect images at ultra-high microwave frequencies that currently are detected only with photodetector (bolometer) elements.

Figure 5:
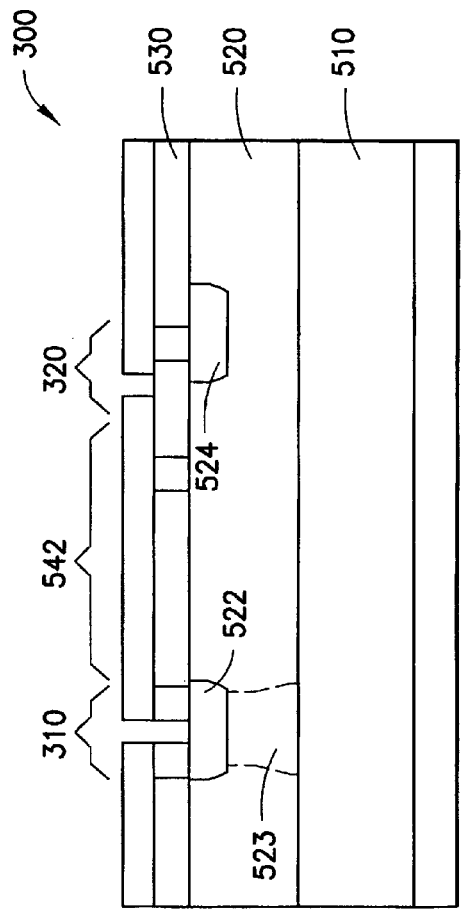
FIG. 5 depicts a cross-sectional view of an infrared sensor element fabricated in semiconductor materials capable of operating in accordance with the present invention.

A cross-sectional view of an antenna-coupled-into-rectifier sensor element 300 fabricated in semiconductor materials and capable of operating in accordance with the invention is shown in FIG. 5. In one implementation of a sensor element 300 made in accordance with the invention, the circuit elements are fabricated, in part, in silicon dioxide 530 and N-type semiconductor layers 520 positioned atop a P-type semiconductor layer 510. The antenna 310 is coincident with the portion of the sensor element 300 above N+ well 522. The varactor coincides with portion 523 beneath N+ well 522. An infrared strip line 542 is depicted between antenna 310 and rectifier 320. The rectifier 320 coincides with a portion at a slight angle above N+ well 524. One skilled in the art will understand that the implementation depicted in FIG. 5 is exemplary and other embodiments capable of operating in accordance with the invention are possible. For example, the sensor element could be implemented in $SiO_2$ and P-type layers positioned above an N-type layer with P+ wells.

Figure 6:
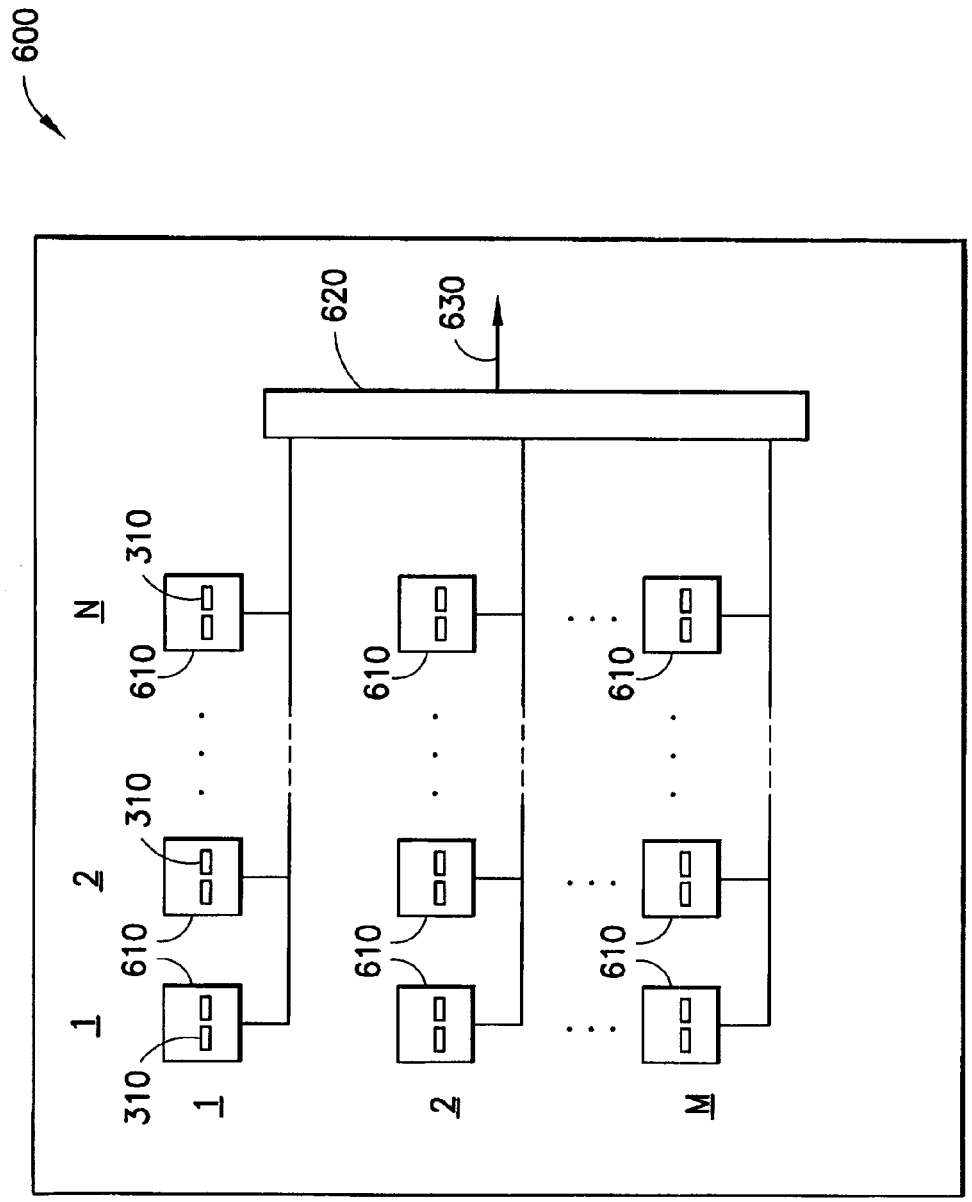
FIG. 6 depicts a sensor made in accordance with the invention.

In imaging applications a plurality of such sensor elements would be fabricated in a monolithic array 600 schematically depicted in FIG. 6. Picture elements ("pixels") 610 are arranged in an N-column M-row sensor array. Although the pixels 610 are not shown as being contiguous, in various embodiments they may be contiguous or non-contiguous. An antenna 310 associated with a sensor element 300 made in accordance with the invention represents that at least one sensor element 300 is associated with each pixel 610. The outputs of each pixel 610 are read out in a row-by-row manner by multiplexer 620 and converted into a serial signal 630.

Figure 7:
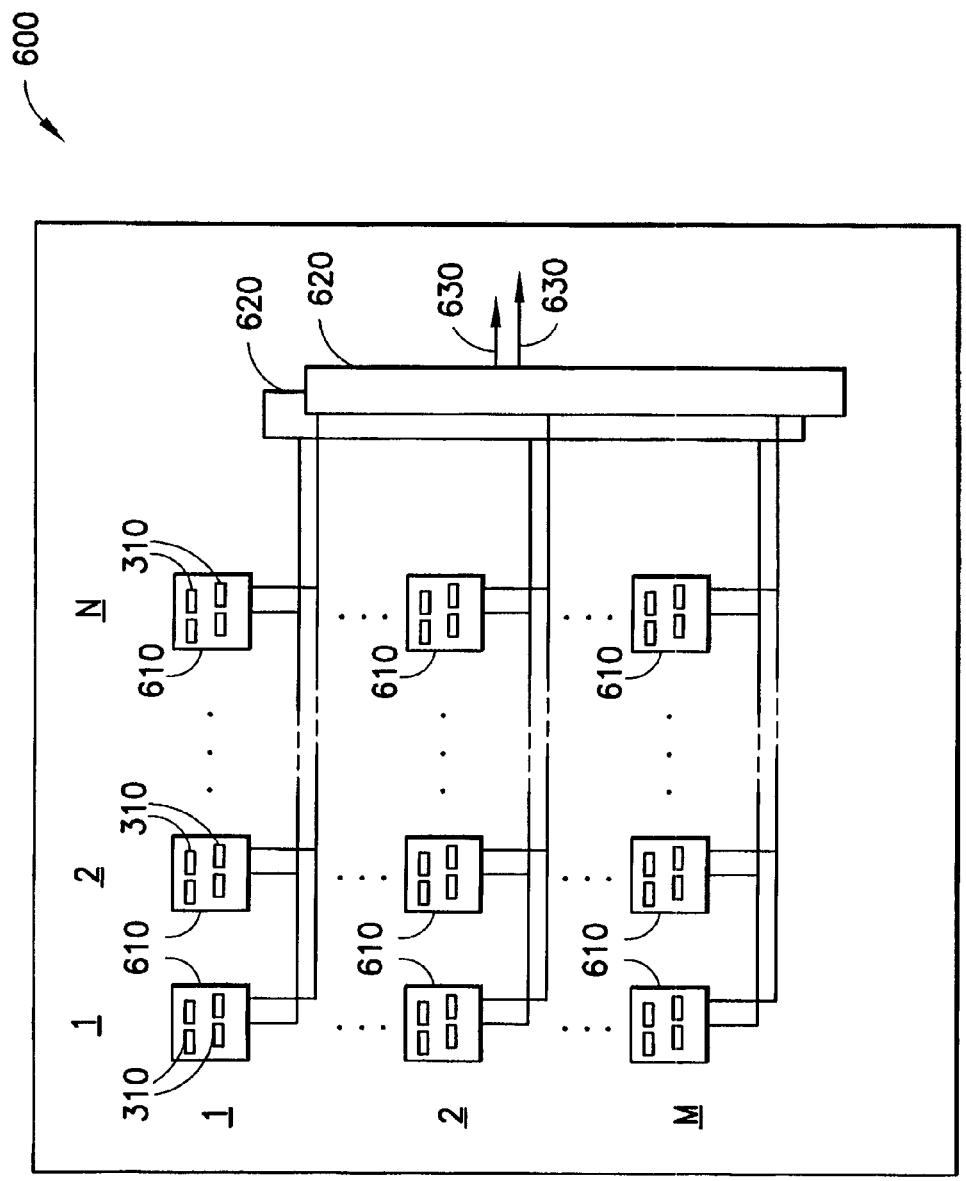
FIG. 7 depicts a multi-spectral sensor made in accordance with the invention.

In another embodiment of the invention it is possible to co-locate two sensors made in accordance with the invention that operate in different wavelengths as depicted in FIG. 7. As depicted in FIG. 7, each pixel 610 has at least two sensor elements 300 (represented by antennas 310). The sensor elements 300 associated with each pixel 610 operate in different wavelengths and have separate multiplexers 620.

Figure 8B:
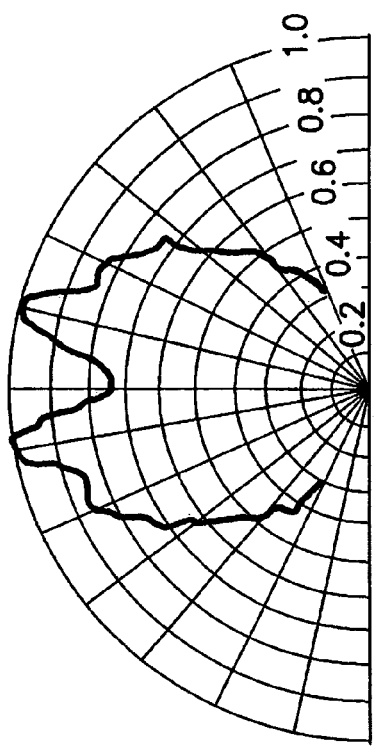
FIGS. 8A-B are charts depicting radiation patterns for antennas implemented as series arrays.
Figure 8A:
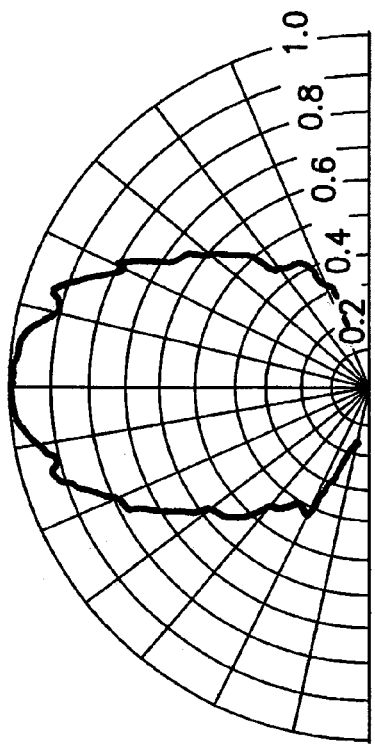

In other embodiments of the invention, multiple-element antenna sub-arrays will increase sensitivity of an image pixel by increasing collection area and fill factor. Such sub-arrays also can be used in larger arrays, to sense two-dimensional images. For example, prior antenna-coupled photodetector arrays consist of two dimensional arrays of detectors that have typical detector areas of 30×30 µm. Such a two-dimensional array of dipole antennas with half-wavelength center-to-center spacing has been shown to sense infrared radiation, and to have a broadside flux acceptance pattern with an on-axis beam maximum. (See, e.g., F. J. González, M. A. Gritz, C. Fumeaux, and G. D. Boreman, "Two Dimensional Array of Antenna-Coupled Microbolometers," *International Journal of Infrared and Millimeter Waves* 23-5, 785-797 (2002)). Multiple-element antenna sub-arrays can be implemented in both series and series-parallel configuration. In one such series configuration, the sensor was fabricated on an IR focal plane array in one embodiment with a $SiO_2$ layer and in another with Aerogel as a thermal isolation layer. Resulting radiation patterns were also measured, using a $CO_2$ laser with an F/8 optical train. Antenna beam widths of approximately 30 degrees were found for each of the embodiments as shown in FIG. 8. A spacing of less than half the wavelength in the substrate (effective wavelength) will avoid the formation of side lobes and more directive patterns. The current invention uses such antenna arrays to great advantage.

Antenna patterns are controlled by dimensions of the antenna and antenna feed structures, among other design parameters. In a further feature of this invention, the preferred antenna beamwidth and beam angle (squint) is such that the small antenna array of each pixel is optimally fit to the optical exit pupil, as shown in FIG. 9. In FIG. 9, (a) and (c) show ray patterns for incident radiation from a scene in on- and off-axis situations, respectively, and (b) and (d) show antenna gain patterns for on- and off-axis pixels, respectively, in accordance with an embodiment of the invention. In this aspect of the invention, flux detected by the sensor is at least improved and in some embodiments maximized for flux emanating from the scene, and reduced or minimized for flux emanating from sensor internal parts. In this way, the invention achieves a "cold-shielding" effect that blocks unwanted flux from hot sensor parts that otherwise would flood the focal plane and dilute image contrast. Prior art sensors achieve this "cold-shielding" result only by use of temperature control and cooling. No such refrigeration is required by this invention, which gives such significant benefits as reduced size, weight, and power requirements.

Design of this custom antenna pattern is enabled by altering the shape and phasing of separate antenna elements. Antennas tuned to infrared radiation are smaller than the optical resolution provided by typical optics and prior-art detector arrays, so multiple elements can be used to set directionality of the composite antenna pattern. Optical resolution customarily is measured in units of a "pixel", which typically is in the range of 10 to 30 micrometers. This is large enough to contain 16 to 64 antenna elements for sensing infrared wavelengths. Directional sensing at each pixel is provided by combining multiple antenna elements on an interconnecting feed structure to a single rectifier element, such that interference effects produce a "squint" angle. Alternatively, uniform phasing could be applied to each antenna feed structure, and a dielectric overlay applied to vary the phasing of radiation on an element-by-element basis. The phasing pattern is different for each pixel, corresponding to the direction of view that is desired.

Optimally designing antenna beamwidth and squint angle of the antenna subarray at each pixel gives a masking result that limits detected infrared flux to that of the image. This masking is like that of the cold radiation shield in a conventional infrared sensor, where reducing the flux also reduces the shot noise associated with photo detection processes that have less-than-perfect quantum efficiencies. The squint angle and beamwidth optimization described herein are novel, inasmuch as no prior art antenna-coupled detectors have recognized the possibility or significance of this technique.

Since, as shown above, each antenna subarray can have a different directionality or "squint", there is an innate ability to form images directly. This variation is best suited to wide-angle sensors, in which resolution is modest and apertures are small. Telephoto systems are less well-suited, since optics give them the benefit of a large signal-collecting aperture and fractional-degree resolution that may be difficult to attain with an antenna alone. However, as nano-fabrication technology progresses, antenna subarrays with large numbers of elements will be able to provide resolution approaching that of a sensor with optics; this will enable an entire sensor to be constructed as a simple flat panel, further decreasing size, weight and cost.

Antennas not only can be tuned, as done with prior art antenna-coupled photodetectors, they can be tuned rapidly enough to provide time-domain-multiplexed (TDM) sensing in two or more spectral bands. This is made possible by the broad frequency response of the novel direct-coupled sensor of the invention, as well as the rapid tuning ability and compact "unit-cell" electronics required for each pixel. For example, for three spectral outputs, the tuner input 350 shown in FIG. 3 is made to step through values V1, V2, and V3, on a repeating basis. The corresponding output then steps through values O1, O2, and O3, the respective flux measurements in each of the three bands, also on a repeating basis. This time-sequenced stepping through values of a single input or output line is referred to as Time-Domain Multiplexing, or TDM.

In this multi-spectral approach, antenna tuner voltage is varied at each time of a spectral-sampling sequence, resulting in multiple spectral outputs. In this example, three wavelengths are sampled, although any number of spectral samples can be made with this invention. Switching times as short as a microsecond are readily achievable, faster than needed for virtually simultaneous detection that interleaves tens of samples within a typical millisecond integration time. Moreover, this tuning is accomplished with the same sensor device as described above for single-color detection; the only difference is that tuner voltage varies instead of remaining a fixed value.

Consequently, multi-spectral sensing is readily achieved in two or more spectral bands using TDM. This approach thus provides an alternative to the multi-spectral implementation depicted in FIG. 7 that required the fabrication of two separate sensors in the same physical space. Nonetheless, both embodiments are within the scope of the invention.

Not only is multicolor sensing provided, it is provided over a broader range of wavelengths than possible with current photodetectors. As will be discussed, the invention maintains high sensitivity simultaneously in the mid-wavelength infrared region of 3 to 5 micrometers and the long-wavelength infrared (LWIR) region of 8 to 12 micrometers. Indeed, high sensitivity is maintained at even longer and shorter wavelengths than those.

For example, sensitivity at 8 to 12 micrometers can be attained with full sensitivity in an imaging sensor that also senses 12 to 18 micrometers, or even longer wavebands. This dual-band high performance cannot be achieved even in cryogenically cooled photodetector sensors, since their sensitivity is degraded at shorter wavelengths in devices that are capable of sensing longer wavelengths. (High sensitivity photodetectors require narrow semiconductor bandgaps for wavelength sensing, and this raises thermal noise and fabrication difficulty).

Indeed, sensitivity also can span infrared and ultra-high microwave frequencies. Although this requires some compromise of antenna efficiency, hence some reduction in sensitivity, it is a capability that is not available in any other sensor except the relatively insensitive bolometer devices. The inherently high sensitivity of this invention still remains high even when reduced to cover wide bandwidths.

FIG. 5 showed a microstrip dipole antenna formed on top of a p/n−/n+ GaAs varactor diode. The microstrip antenna collects electromagnetic (EM) radiation over wavebands determined by the resonant frequency of the antenna, which generates an electric field (E—Field) and a magnetic field (H—Field). The E and H fields correspond to an equivalent antenna capacitance ($C_a$) and inductance ($L_a$).

Figure 10:
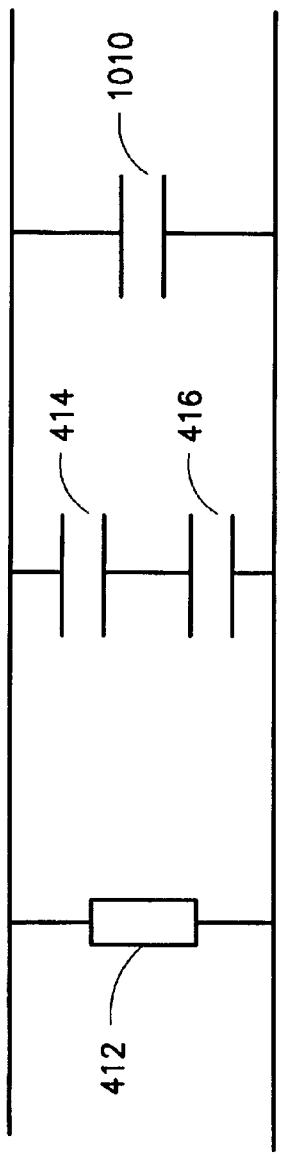
FIG. 10 is an equivalent circuit diagram of an infrared sensor element made in accordance with the invention.

The diode directly under the antenna is a varactor ($C_v$) 416 in series with $C_a$ 414. An equivalent circuit including the fringe-field capacitance ($C_f$) 1010 is shown in FIG. 10 (a modified version of FIG. 4) with full length of the antenna b=0.44 um cross-arm width a=0.1 um, distance from contact to feed point d=0.20 um, and h=0.25 um.

The resonance frequency ($f_r$) for the circuit is given by:

$$f_r = \frac{1}{2\pi\sqrt{L_a(C_{Eq} + C_f)}} \quad (1)$$

Where $C_{Eq}$ is the series equivalent capacitance for $C_v$ and $C_a$ given by:

$$C_{Eq} = \frac{C_a C_v}{C_a + C_v} \quad (2)$$

Eq. 2 for $C_{Eq}$ is evaluated based on $C_a$ of the microstrip dipole antenna and is found using:

$$C_a = \frac{\varepsilon_o \varepsilon_r ab}{2h} \cos^{-2}\left(\frac{\pi d}{b}\right) \quad (3)$$

where the average relative permittivity ($\varepsilon_r$) is 9.0. $C_v$ is evaluated knowing the built-in voltage ($V_{bi}$), the tuning voltage ($V_T$), and the doping concentration ($N_D$) and is given by:

$$C_v = \frac{\varepsilon_{GaAs}\varepsilon_o ab}{\sqrt{\dfrac{2\varepsilon_{GaAs}\varepsilon_o}{qN_D(V_{bi} - V_T)}}} \quad (4)$$

The inductance $L_a$ of the antenna is calculated using:

$$L_a = \frac{1}{\omega^2(C_{Eq})} \quad (5)$$

For calculation of the fringe-field capacitance $C_f$, we consider that the microstrip has electrical dimensions greater than its physical dimensions. For the antenna shown in FIG. 5, the fringing affects the cross-arm width a of the dipole. The difference is found as:

$$\Delta a = 0.412h \frac{(\varepsilon_r + 0.3)\left(\dfrac{a}{h} + 0.264\right)}{(\varepsilon_r - 0.258)\left(\dfrac{a}{h} + 0.8\right)} \quad (6)$$

Now $C_f$ can be found, where $\lambda_r=3$ μm is the theoretical resonant wavelength, using:

$$Cf = \frac{0.01668\varepsilon_r}{\omega}\left(\frac{\Delta a}{h}\right)\left(\frac{a}{\lambda_r}\right) \quad (7)$$

Figure 11:
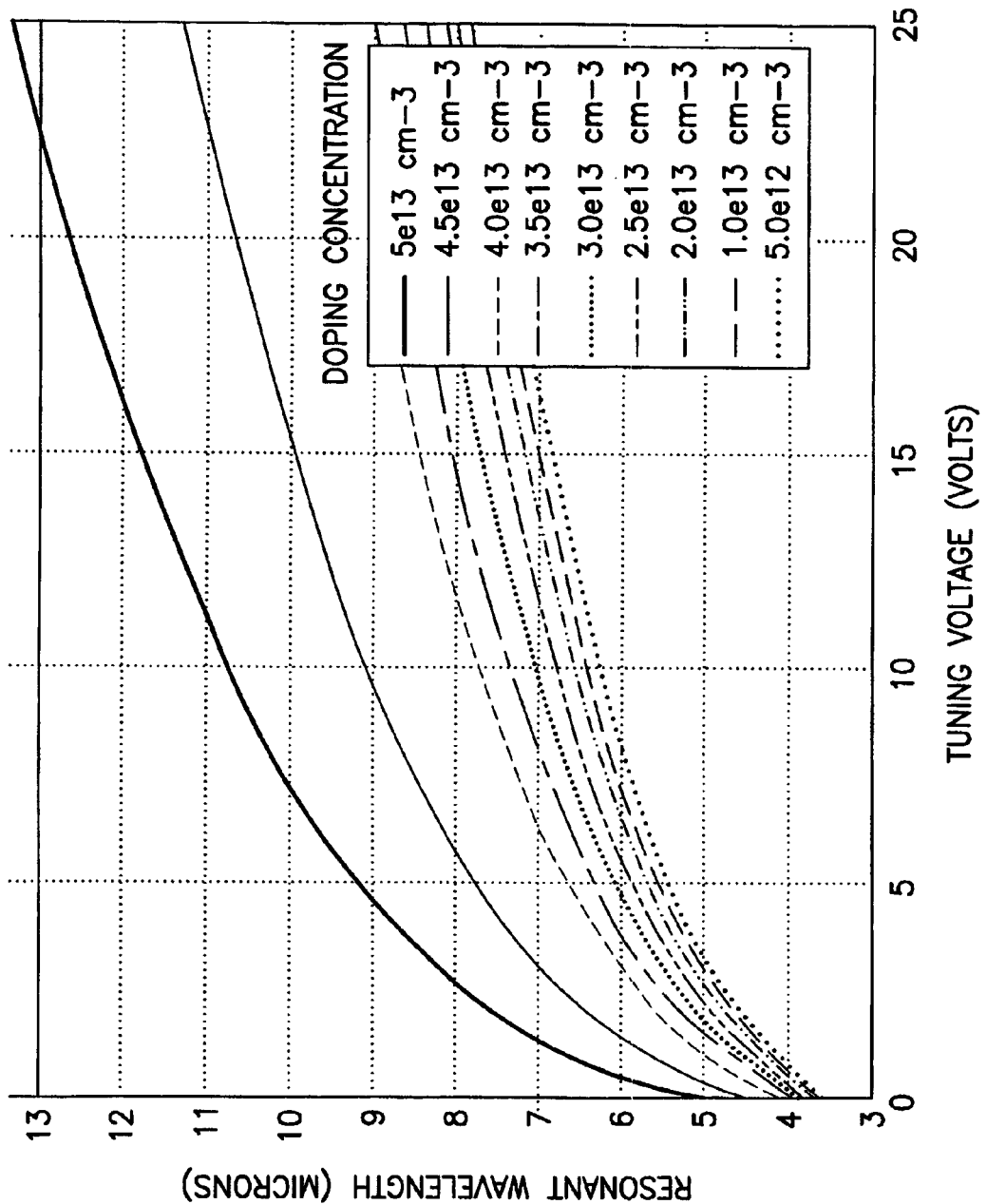
FIG. 11 is a graph depicting the resonance wavelength of an antenna-coupled-into-rectifier sensor element as function of applied tuning voltage and doping.

Using Eq. 1, with results from Eqs. 3, 4, 5 and 7, allows the resonant wavelength ($\lambda=c/f$) of the antenna-coupled-into rectifier sensor element as a function of applied voltage $V_T$. The results of this model are shown in FIG. 11. In this figure, the range is limited to 10 volts, but could be more, since the breakdown voltage for 0.25 μm silicon is 25 volts.

For two color operation, current cooled detectors use time-domain multiplexing to switch in 70 nanoseconds, and integrate for a similar time. Fifteen or so such short samples are integrated for each frame, yielding a sensor integration time on the order of 1 millisecond. For the antenna-coupled-into-rectifier sensor element, the switching speed is determined based on the time constant of the detector. The time constant is given by:

$$\tau = RC \quad (8)$$

Where:
R is the detector resistance (300Ω)
C is the detector capacitance (4.4×10⁻⁶ pF)
For a nominal device resistance of 300Ω and a capacitance of 4.4×10⁻⁶ pF a time constant of 1.25 femtoseconds is obtained from Eq. 8.

Both temperature effects and manufacturing errors will cause a change in the resonant wavelength of the system. Current lithographic technologies can manufacture parts with a pattern accuracy of 20 nm. The effective shift of wavelength due to the pattern accuracy is given by:

$$\sigma = 1 - \frac{\lambda_D}{\lambda_A} \quad (9)$$

where:
$\lambda_D$ is the desired effective wavelength ($\lambda_D=1.206$ μm)
$\lambda_A$ is the actual effective wavelength due to accuracy errors $\lambda_D=1.226$ μm
σ is the percentage change in the resonant wavelength due to accuracy errors from the manufacturing process.

The changes in the dielectric constant because of temperature effects will cause a shift in the amount of wavelength tuning. The temperature effect on GaAs dielectric constant is not well established, but can be determined by experimental results and effectively modeled.

Sensitivity of a sensor made in accordance with this invention is shown in Table 1. A conventional sensor has an F/2 optic with 2.08 diameter lens and 52×10⁻⁶ steradian instantaneous field of view (IFOV); it is sensitive to radiation within a 0.25 μm. The figures for a sensor made in accordance with the invention are based on those same characteristics. To avoid classification issues, wavelength values are approximate, but close enough not to alter comparative results. Because the novel sensor is uncooled, calculations allowed a 3° C. internal temperature rise over the stated ambient temperatures. Additional "current cryogenic" NEI values at 10 μm were calculated by simply scaling NEI of a conventional sensor nine-fold, based on the detectivity (D*) ratio of ideal photovoltaic detectors with those two cutoff wavelengths. In all cases, a 300 K background temperature was assumed.

TABLE 1

| Wavelength | Ambient Temperature | Invention |
|---|---|---|
| 4.5 μm | 20° C. | 4.4 pW/cm² |
| 4.5 μm | 90° C. | 4.8 pW/cm² |
| 10 μm | 20° C. | 15.4 pW/cm² |
| 10 μm | 55° C. | 16.3 pW/cm² |
| 10 μm | 90° C. | 17.1 pW/cm² |

Sensitivity in the MWIR is close to that of a modern cryogenically-cooled sensor, yet no cooling is required. The conventional sensor operates at 90K, where a LWIR sensor will require cooling to 80K or below. A LWIR conventional sensor will require a larger package to operate at 90K, since much larger cryocooler will be required to attain the lower LWIR detector temperatures. Sensitivity in the LWIR surpasses that of a cryogenically-cooled sensor.

The above figures assume an F/2 lens, which is what can be achieved within the constraints of cryogenically-cooled focal planes. However, the antenna-coupled-into-rectifier sensor element also has significant optical benefits that will further reduce sensor cost, or even raise performance.

Optical benefits result from eliminating the need to place a lens stop far outside the lens; there is no cooling, hence no coldstop and no Dewar. Since small lenses such as required by conventional sensors can have only one stop, placing it well outside the lens creates an optical balance that complicates design and raises fabrication tolerances significantly. In addition, eliminating the Dewar also removes the requirement to place last lens element away from the focal plane. These optical benefits can lower cost, by relaxing tolerances and possibly reducing lens elements from four to three.

Alternatively, without increasing lens cost, these optical benefits may enable an f/1 lens, which would quadruple sensitivity. Such an enhancement can be used directly to enhance performance, or indirectly to increase sensor design margins and further reduce cost.

Relative to current state-of-the-art "uncooled" detectors, the antenna-coupled-into-rectifier sensor element will have stunning performance; it provides cryogenic-quality performance that is several orders of magnitude better than achievable with pyroelectric and other such devices.

When putting a metal on top of a semiconductor, a Schottky diode or an ohmic contact is formed, depending on the doping concentration, the interface properties, and the difference between the metal work function (φm) and the semiconductor work function (φs). If the metal work function is larger than the semiconductor work function, then a Schottky diode is formed.

The Schottky diode is electrically similar to an abrupt one-sided p/n junction except the Schottky diode is a majority carrier device, where the minority carrier transport and storage are nearly absent. Therefore, Schottky devices are suitable for high speed switches.

In a junction diode the excess minority carrier devices stored in the quasi-neutral regions must be removed before the device can be switched from forward bias to reverse bias. Since a Schottky diode is a majority carrier device, the diffusion component of the current is negligible. The reverse diode recovery time for a Schottky diode is often limited by the internal RC time constant associated with the junction capacitance and the bulk series resistance.

In an ideal metal-semiconductor (n-type) Schottky junction when the metal and semiconductor contact is formed, there is a work function difference formed across the interface. The potential difference is defined as the junction built- As dimensions currently scale downward from the area of microelectronics to nano-scale electronics, the cut-off frequency of the Schottky diode will also increase because the capacitance of the device will decrease. Table 2 shows a list of manufacturers with their perspective cutoff frequencies as well as the proposed IR GaAs rectifier.

TABLE 2

List of diode manufacturers with commercially available components.

| Manufacturer | Part Number | Series Resistance (Ω) | Total Capacitance (pF) | Diode Length (μm) | Diode Width (μm) | Diode Area (cm$^2$) | Cutoff Frequency (GHz)* |
|---|---|---|---|---|---|---|---|
| Agilent | HSCH-9401 | 20 | 0.045 | N/A | N/A | N/A | 177 |
| Metelics | MGS801 | 7 | 0.060 | N/A | N/A | N/A | 379 |
| Metelics | MGS901 | 7 | 0.060 | N/A | N/A | N/A | 379 |
| MDT | MS8150 | 9 | 0.060 | N/A | N/A | N/A | 295 |
| Virginia Diodes | VDI-SC1T2-S20 | 9 | 0.011 | 4 | 2.5 | $1 \times 10^{-7}$ | 1608 |
| N/A | IR GaAs Diode** | 362 | $4.4 \times 10^{-6}$ | 1 | 0.1 | $1 \times 10^{-9}$ | $1 \times 10^5$ |

Figure 12:
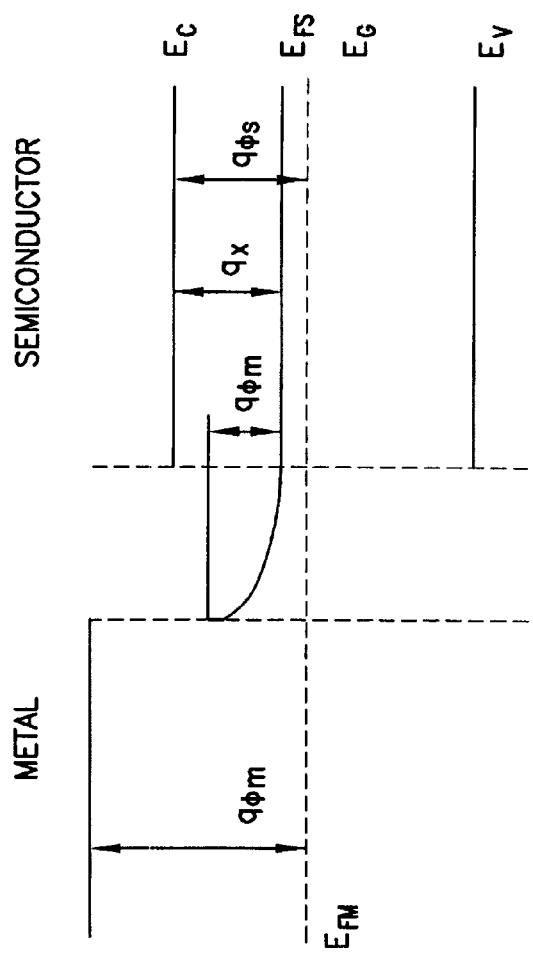
FIG. 12 is a Schottky diode energy band diagram.

*The cutoff frequencies shown are minimums based on the maximum values specified for series resistance and total capacitance.
**The GaAs Diode shown is a proposed diode that needs to be fabricated as a custom design to achieve the cutoff frequency shown.

in potential for the semiconductor and the band bending observed in FIG. 12. The junction built-in potential is given by:

$$\phi_i = \phi_m - \phi_s \quad (10)$$

Where:
$\phi_m$ is the work function of Au (4.75 eV)
$\phi_s$ is the GaAs work function.
The work function is given by:

$$\phi_s = \chi + 0.5 E_G - V_T \ln\left(\frac{N_D}{n_i}\right) \quad (11)$$

Where:
$\chi$ is the electron affinity of GaAs (4.07 eV)
$E_G$ is the energy gap of GaAs (1.424 eV)
$V_T$ is the thermal voltage (0.0259 eV)
$N_D$ is the doping concentration ($1 \times 10^{12}$ cm$^{-3}$)

Figure 13:
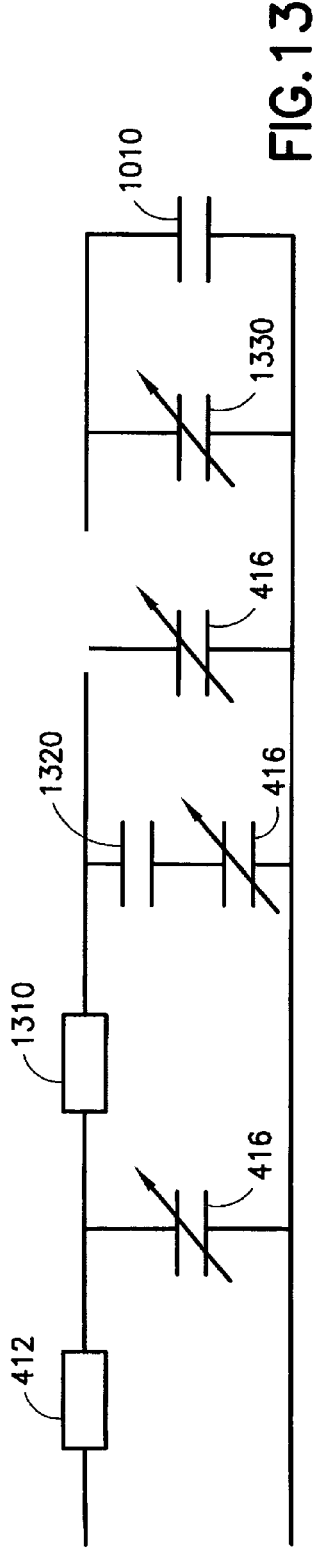
FIG. 13 is an equivalent circuit diagram of an infrared sensor element made in accordance with the present invention.

In order to determine the theoretical maximum frequency the Schottky diode will rectify, the cut-off frequency of the diode must be determined. A layout of the proposed device was shown in FIG. 5. An equivalent circuit (another variation of FIG. 4) including the transmission line capacitance 1320, the transmission line inductance ($L_t$) 1310, the varactor capacitance (Cv) 416, the fringe field capacitance (Cf) 1010, and the forward biased junction capacitance (Cd) 1330 is shown in FIG. 13. The cut-off frequency is given by:

$$f_c = \frac{1}{2\pi R_s C_{Eq}} \quad (12)$$

Where:
$R_s$ is the forward bias resistance of the diode
$C_{Eq}$ is the equivalent circuit capacitance.

The equivalent circuit capacitance ($C_{Eq}$) is given by:

$$C_{Eq} = \frac{C_a C_v}{C_a + C_v} + C_v + C_d + C_f \quad (13)$$

Where:
$C_v$ is given by Eq. 4
$C_f$ is given by Eq. 7
$C_d$ is the forward biased junction capacitance, which is given by:

$$C_d = \frac{\varepsilon_{GaAs} \varepsilon_o A}{\sqrt{\frac{2\varepsilon_{GaAs} \varepsilon_o}{q N_d}(V_{bi} + V_a)}} \quad (14)$$

Figure 14:
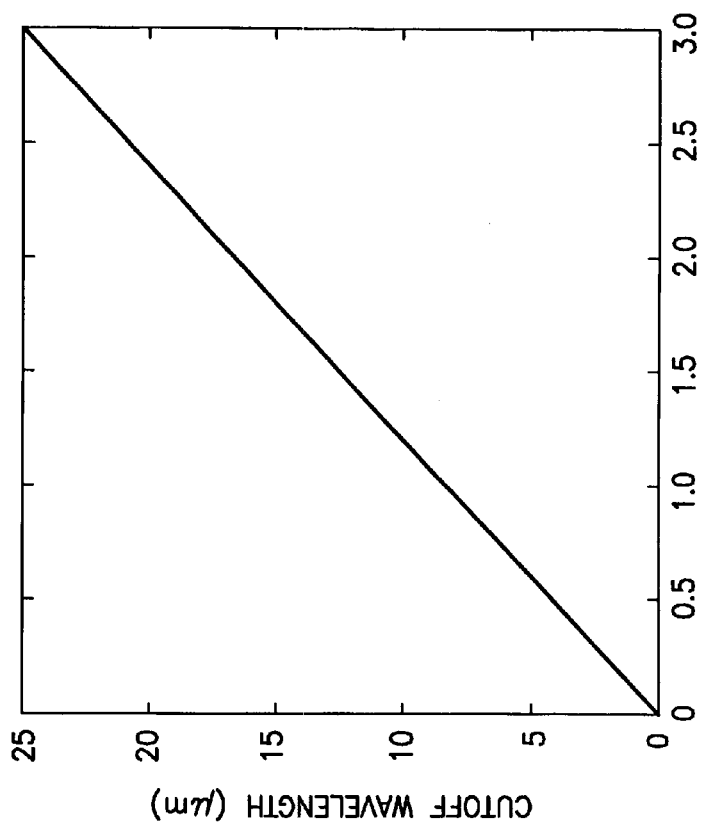
FIG. 14 is graph depicting cut-off frequency as a function of bulk series resistance.

Where:
A is the active device area (0.1 μm×1 μm)
$\varepsilon_{GaAs}$ is the dielectric constant for GaAs;
$\varepsilon_o$ is the permittivity of free space
q is the charge of an electron
$V_a$ is the forward bias voltage applied Using Eq. 12, with results from Eqs. 4, 13 and 14 allows the cut-off frequency as function of the bulk series resistance (Rs) to be plotted. The results of the calculation are shown in FIG. 14. For a cut-off wavelength of 3 μm, the required Rs is 362 ohms.

Thus it is seen that the foregoing description has provided by way of exemplary and non-limiting examples a full and informative description of the best method and apparatus presently contemplated by the inventors for implementing direct detection antenna-coupled infrared sensor elements and sensors. One skilled in the art will appreciate that the various embodiments described herein can be practiced individually; in combination with one or more other embodiments described herein; or in combination with infrared sensors differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. An infrared sensor element comprising:
   a plurality of antennas responsive to infrared radiation, the plurality of antennas having outputs, the plurality of antennas collectively having a beam width and beam angle, wherein the beam width and beam angle conform to an optical exit pupil of an optical system in which the infrared sensor element is positioned; and
   a junction diode rectifier coupled to the outputs of the plurality of antennas, the junction diode rectifier configured to convert alternating current induced in the antennas by incident infrared radiation into a rectified signal, the rectified signal corresponding to a magnitude of the incident infrared radiation impinging the antennas.

2. The infrared sensor element of claim 1, wherein the junction diode rectifier comprises at least a Schottky diode.

3. The infrared sensor element of claim 1, wherein the junction diode rectifier comprises at least a Mott diode.

4. The infrared sensor element of claim 1, wherein the junction diode rectifier comprises a half-wave rectifier.

5. The infrared sensor element of claim 1, wherein the junction diode rectifier comprises a full-wave rectifier.

6. The infrared sensor element of claim 1, the infrared sensor element having a wavelength response, the infrared sensor element further comprising:
   a tuning circuit configured to tune the wavelength response of the infrared sensor element.

7. The infrared sensor element of claim 6, wherein the tuning circuit comprises at least a varactor.

8. The infrared sensor element of claim 1, the infrared sensor element further comprising:
   a low noise amplifier circuit coupled to an output of the junction diode rectifier.

9. An infrared sensor comprising:
   a plurality of infrared sensor elements, each of the plurality of sensor elements comprising:
   a plurality of antennas responsive to infrared radiation, the plurality of antennas having outputs, the plurality of antennas collectively having a beam width and beam angle, wherein the beam width and beam angle are configured to conform to an optical exit pupil of an optical system in which the infrared sensor element is positioned;
   a junction diode rectifier coupled to the outputs of the plurality of antennas, the junction diode rectifier configured to convert alternating current induced in the antennas by incident infrared radiation into a rectified signal, the rectified signal corresponding to a magnitude of the incident infrared radiation impinging the antennas; and
   a multiplexing circuit coupled to the infrared sensor elements, the multiplexing circuit configured to combine the signals generated in the infrared sensor elements by impinging infrared radiation into a serial signal.

10. The infrared sensor of claim 9, wherein the junction diode rectifiers of the infrared sensor elements comprise at least Schottky diodes.

11. The infrared sensor of claim 9, wherein the junction diode rectifiers of the infrared sensor elements comprise at least Mott diodes.

12. The infrared sensor of claim 9, wherein the junction diode rectifiers of the plurality of infrared sensor elements comprise half-wave rectifiers.

13. The infrared sensor of claim 9, wherein the junction diode rectifiers of the plurality of infrared sensor elements comprise full-wave rectifiers.

14. The infrared sensor of claim 9, the infrared sensor elements having a wavelength response, the infrared sensor elements further comprising:
   tuning circuits configured to tune the wavelength response of the infrared sensor element.

15. The infrared sensor of claim 14, wherein the tuning circuits comprise at least varactors.

16. The infrared sensor of claim 14 further comprising a time division multiplexing circuit configured to control the tuning circuits during each of at least two time segments, wherein during the time segments the sensor elements are tuned to different infrared wavebands.

17. An infrared sensor comprising:
   at least two arrays of sensor elements, the at least two arrays of sensor elements physically coincident, but each of the at least two arrays operating as separate sensors, each of the at least two arrays of sensor elements further comprising:
   a plurality of sensor elements, each of the sensor elements comprising:
   a plurality of antennas responsive to infrared radiation, the plurality of antennas having outputs, the antennas collectively having a beam width and beam angle, wherein the beam width and beam angle are configured to conform to an optical exit pupil of an optical system in which the infrared sensor element is positioned;
   a junction diode rectifier coupled to the outputs of the plurality of antennas, the junction diode rectifier configured to convert alternating current induced in the antennas by incident infrared radiation into a rectified signal, the rectified signal corresponding to a magnitude of the incident infrared radiation impinging the antennas, wherein the junction diode rectifier is configured to be connected directly to signal processing circuitry; and
   a multiplexing circuit coupled to the infrared sensor elements, the multiplexing circuit combining the signals generated in the infrared sensor elements by impinging infrared radiation into a serial signal.

18. The infrared sensor of claim 17 wherein each of the arrays of infrared sensors are adapted to operate in different infrared bandwidths.

19. A sensor element comprising:
   a tunable antenna responsive to radiation spanning from infrared to ultra-high frequency microwave, the tunable antenna having an output; and
   a junction diode rectifier directly coupled to the output of the tunable antenna, the junction diode rectifier configured to convert alternating current induced in the tunable antenna by incident radiation corresponding to a frequency spanning infrared to ultra-high microwave frequencies into a rectified signal, the rectified signal corresponding to a magnitude of the incident radiation impinging the tunable antenna, wherein the sensor element is configured to operate without cooling.

20. A sensor comprising:
   a plurality of sensor elements, each of the plurality of sensor elements comprising:

a tunable antenna responsive to radiation spanning from infrared to ultra-high frequency microwave, the tunable antenna having an output;

a junction diode rectifier directly coupled to the output of the tunable antenna, the junction diode rectifier configured to convert alternating current induced in the tunable antenna by incident radiation corresponding to a frequency spanning infrared to ultra-high microwave frequencies into a rectified signal, the rectified signal corresponding to a magnitude of the incident radiation impinging the tunable antenna; and a multiplexing circuit coupled to the sensor elements, the multiplexing circuit configured to combine signals generated in the sensor elements by the incident radiation into a serial signal, wherein the sensor is configured to operate without cooling.

* * * * *